F. BARBY.
SUCTION APPARATUS.
APPLICATION FILED FEB. 4, 1910.

982,923.

Patented Jan. 31, 1911.

Witnesses.
Louis Courtois.
O. Nally.

Inventor.
Ferdinand Barby
By Carl Sewes
His Attorney

UNITED STATES PATENT OFFICE.

FERDINAND BARBY, OF PARIS, FRANCE.

SUCTION APPARATUS.

982,923.   Specification of Letters Patent.   Patented Jan. 31, 1911.

Application filed February 4, 1910. Serial No. 542,064.

*To all whom it may concern:*

Be it known that I, FERDINAND BARBY, a citizen of France, and resident of 27 Avenue d'Italie, Paris, France, have invented Improvements in and Relating to Suction Apparatus, of which the following is a specification.

The present invention concerns improvements in and relating to suction apparatus conveying fluid, semi-fluid, and solid substances and has for its object to convey and to discharge substances as aforesaid, for instance dust, sand, and the like, the conveying of the said substances being effected in a very quick and simple manner.

The principle of this apparatus is to transform the elastic power of vapor or the driving fluid and the pressure into a living force and to make use of this force in order to suck the substances to be ejected and to deposit them in a convenient place.

The different parts are more clearly described in their coöperative relation in the body of the specification and in the claim.

In order that this invention may be clearly understood reference is made to the accompanying drawing, in which—

Figure 1:
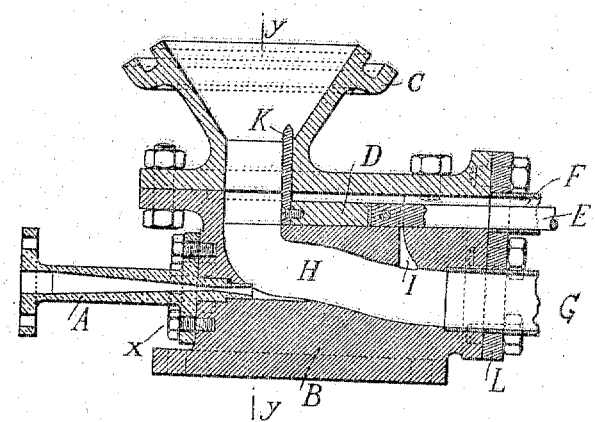
Figure 2:
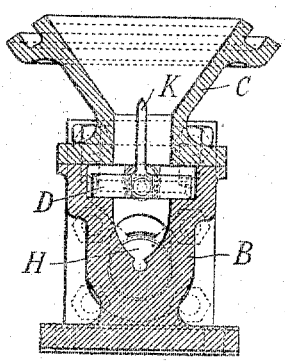

Figure 1 shows the apparatus in sectional elevation, while Fig. 2 is a vertical section of the same on line $y$—$y$ of Fig. 1.

The apparatus consists chiefly of a nozzle A, the body B, the hopper C and a reciprocating slide D.

The nozzle A is a pipe like connection, the bore of which is shaped like two cones connecting at their apex (Fig. 1). The purpose of this is to impart to the molecules a greater speed, first by the compression in the converging cone, secondly by the expansion in the smaller diverging cone. The nozzle A is fastened to the body B by means of screws $x$ or any other suitable means. The body B is preferably of the shape shown in Fig. 1, and is provided with a channel H, which is vertical in its upper portion and then slopes away obliquely, all sharp edges being avoided.

The hopper C is of metal and is secured to the body B by means of bolts and nuts or other suitable means. A chamber is formed between the hopper C and the body B for the reception of the slide D. This slide consists of a flat metal plate of rectangular cross section, and carries a spike K which serves to break up large masses of material and so prevent them from accumulating at the base of the hopper. Furthermore the slide is reciprocated by means of a rod E inclosed in a pipe F and actuated by any suitable mechanism (not shown in the drawing). Connected to the body, so that it forms the continuation of the channel H, is a pipe G leading to the spot where it is desired to deposit the material. The pipes F and G are secured to a cap or plate L and this latter is secured to the body B and the hopper C by means of suitable screws. An opening I is arranged from the chamber of the slide B to the channel H so as to allow for the passage of dust or other bodies which might otherwise collect in the slide chamber.

The operation of the apparatus is as follows:—The slide D is first made to cover the apex or lower end of the hopper C while a powerful current of air or steam is admitted through the nozzle A by means of a suitable pump or by running a pipe between the nozzle A and a boiler (not shown in the drawing). As with all the known types of apparatus adapted to be driven by the elastical expansion of suitable driving means, such as air or vapor, a lowering of the pressure is created in the inner part of the cone. Thus when the rod E is actuated, any matter or substance situated in the hopper is drawn in partly by its own weight and partly by the lowering of the pressure under the slide, and is forced along the pipe G owing to the speed and pressure of the air or steam as it emerges from the nozzle A.

The upper end of the hopper C is recessed or channeled, so that if desired an annular ring could be placed on top of the hopper to increase the holding capacity.

This apparatus is specially applicable for unloading ships cargoes, when they consist of sand and similar material, though it will be understood that the apparatus can be used for many other purposes, such for instance as the cleaning of flues in steam generator furnaces.

Having fully described my invention, what I claim and desire to secure by Letters Patent is:—

Improvements in and relating to suction apparatus, comprising in combination, a hopper, a body supporting the latter, a chamber formed between the hopper and said body, a slide arranged in the chamber, a rod adapted to reciprocate said slide, and a spike carried by the latter, a pipe inclosing said rod, a nozzle connecting with said body, the bore of the nozzle being that of two cones joined at their apex, a pipe adapted to forward the material to the required place, a plate to which said pipes are connected, said plate being secured to said hopper and said body, substantially as described and shown, and for the purpose set forth.

In testimony whereof I have hereunto set my hand in the presence of two subscribing witnesses.

FERDINAND BARBY.

Witnesses:
 HANSON C. COXE,
 JOHN BAKER.